| United States Patent [19] | [11] | 4,110,291 |
|---|---|---|
| Barabas et al. | [45] | Aug. 29, 1978 |

[54] COPOLYMER EMULSIONS FOR THICKENING ACRYLIC POLYMER LATICES

[75] Inventors: Eugene S. Barabas, Watchung; Andrew Klein, Somerville; Dru W. Alwani, Wayne, all of N.J.

[73] Assignee: GAF Corporation, New York, N.Y.

[21] Appl. No.: 773,503

[22] Filed: Feb. 18, 1977

[51] Int. Cl.$^2$ .............................................. C08L 33/06
[52] U.S. Cl. .................. 260/29.6 RW; 260/29.6 WB
[58] Field of Search ............. 260/29.6 RW, 29.6 WB

[56] References Cited

U.S. PATENT DOCUMENTS

| 3,035,004 | 5/1962 | Glavis | 260/29.6 RW |
|---|---|---|---|
| 3,657,175 | 4/1972 | Zimmerman | 260/29.6 T |
| 3,810,859 | 5/1974 | Mikofalvy | 260/29.6 RW |
| 3,891,591 | 6/1975 | Chang et al. | 260/29.7 W |
| 3,894,980 | 7/1975 | De Tomniaso | 260/29.7 W |

FOREIGN PATENT DOCUMENTS 870,994  6/1961  United Kingdom.

*Primary Examiner*—Eugene C. Rzucidlo
*Attorney, Agent, or Firm*—Walter C. Kehm; Arthur Dresner

[57] ABSTRACT

Copolymer emulsions comprising (1) an α,β-unsaturated carboxylic acid and (2) methyl acrylate are useful as thickening agents, particularly in acrylic polymer latices.

6 Claims, No Drawings

COPOLYMER EMULSIONS FOR THICKENING ACRYLIC POLYMER LATICES

FIELD OF THE INVENTION

This invention relates broadly to latex copolymers prepared from, as monomers, (1) an α,β-unsaturated carboxylic acid of the formula

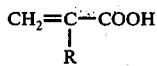  (I)

where R is methyl or ethyl, and (2) methyl acrylate, which has the structure

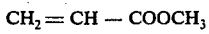

These are low viscosity latices, useful as thickeners particularly for acrylic polymer latices.

DESCRIPTION OF THE PRIOR ART

Various types of thickeners or thickening agents are known in the art. Some, such as those described in U.S. Pat. No. 3,810,859, describe latices which contain a small amount (0.5-6%) of an organic acid together with a glycidyl monomer. While such latices themselves are said to be thickenable, no doubt via cross-linking, it is not within the contemplation of this patent to utilize such latices to thicken other latices.

Other types of thickeners such as those disclosed in U.S. Pat. No. 3,657,175, involve latices entailing a complex formula, e.g. such as one derived from monomers of butadiene, styrene, methacrylic acid, and an ethoxylated alcoholic half ester of maleic acid. Thus, for such latices to be stable, butadiene and styrene must be present, along with the maleic acid half ester, which is said to be an essential ingredient.

U.S. Pat. No. 3,035,004 relates broadly to certain latex copolymers of methacrylic acid and alkyl acrylate and to their various uses and applications as thickeners. However, the preparations of this patent are made by a method that is entirely different from the one used in our invention. Therefore, these compounds are chemically different from the emulsions described herein. While the products of U.S. Pat. No. 3,035,004 are made in water as the reaction medium, they are latices of poor stability and separate on standing. Therefore, they have to be transformed into water soluble salts in order to be useful. On the other hand, the latices of the present invention have very good shelf-stability.

The difference is further demonstrated by the superior water-viscosity of the polymers employed in the present invention. Accordingly, a copolymer emulsion, made by the process of U.S. Pat. No. 3,035,004 with 53/47 methacrylic acid-ethylacrylate monomer ratio, when used at 0.5% concentration at pH 7.0, increased the viscosity of water only to 18.5 cps. The result obtained under the same conditions with one of the copolymers of the present invention was 3,500 cps. — that is, a one hundred and eighty-eight fold increase. Furthermore, U.S. Pat. No. 3,035,004 requires its latices to be transformed to soluble salts because of lack of stability; whereas, this is not true of the requirements of the present invention with respect to its latices.

SUMMARY OF THE INVENTION

This invention generally relates to systems particularly suitable for the thickening of emulsions consisting of water and an acrylic polymer. More particularly, this invention relates to stable aqueous latices of a copolymer which can induce said thickening effect, one component of which is an α,β-unsaturated, organic carboxylic acid of the formula:

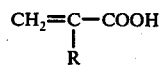

where R represents methyl, or ethyl, and the other component of which is methyl acrylate, i.e.,

These monomers, when polymerized, result in a copolymer structure comprising the following repeating units:

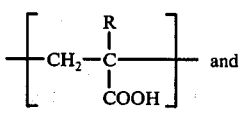 and

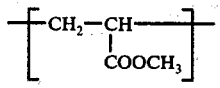

The copolymer latices themselves are of low viscosities but act as thickening agents when added to acrylic polymer latices.

DESCRIPTION OF THE PREFERRED EMBODIMENTS

In a preferred embodiment, the latices comprise a copolymer structure with repeating units of (1) methacrylic acid and (2) methyl acrylate.

In a preferred mode of practice of the present invention, the resultant latex contains both ingredients in the following amounts and proportions:

(1) from about 30% to about 75%, preferably from 50% to 65%, by weight of an α,β-monethylenically unsaturated carboxylic acid of Formula I, preferably methacrylic acid, ethacrylic acid, or a mixture thereof with other unsaturated carboxylic acids such as acrylic acid. The amount of such other unsaturated carboxylic acids which can be employed in such mixtures can vary up to about 50% or more of such mixtures depending upon the concentration of the methyl ester units in the resulting polymer. As the concentration of the methyl ester increases, increasing amounts of such other unsaturated carboxylic acids, e.g., acrylic acid, can be employed to the extent that a stable latex can still be obtained.

(2) from about 25% to about 70%, preferably 35% to 50%, by weight of the methyl ester of acrylic acid.

The chemical composition of the present copolymer, especially the fact that it has to be based upon methyl acrylate, is an essential feature of the present invention since other esters fail to give the good results obtained by the practice of this invention.

Beside the aforedescribed monomers, small amounts of some bifunctional, ethylenically unsaturated cross-linking monomer may also be added to the foregoing copolymer. This monomer has to be capable of polymerizing under free radical conditions so as to covalently bond different chains of the polymer. Polyfunctional monomers, such as divinyl benzene, polyethylene glycoldimethyacrylate, methylene-bis-acrylamide, etc., can serve as examples. Other monomers, which can render the polymer curable through heat treatment or otherwise crosslinkable, such as methylolacrylamide, glycidylmethacrylate, epoxybutadiene, etc., can also be used as comonomers.

Chain transfer agents may be used to regulate the average molecular weight of the polymer. Preferred agents are mercaptans such as t-dodecylmercaptan.

The preparation of the polymers of this invention is carried out in an emulsion system. The term "emulsion", as used herein, is intended to mean a true colloidal dispersion of the copolymers in water.

Polymerization is effected in the presence of a catalyst or initiator, preferably one which serves as a thermally activated source of free radicals. Among such catalysts may be mentioned peracetic acid, hydrogen peroxide, persulfates, perphosphates, perborates, percarbonates, etc. The preferred catalyst is ammonium persulfate, as it provides efficient reaction rates and contains a fugitive cation. The amount of initiator used is normally about 0.03 to 3.0%, by weight, based on the weight of the total monomers, and preferably from 0.25 to 0.5%. Preferably, the initiator is a redox combination of the water soluble persulfate as the oxidizing component and a hydrosulfite, e.g., sodium hydrosulfite as the reducing component of the redox combination. Water soluble bisulfites, metabisulfites or thiosulfates, reducing sugars, formaldehyde sulfoxilate, etc., may be used in lieu of the hydrosulfites. Other typical redox combinations, such as sodium azide and ceric ammonium sulfate, titanium trichloride and hydroxylamine, and the like, may also be used. Generally useful proportions of the indicated persulfate-hydrosulfite system are 0.01% to 1.0% for the oxidizing component and 0.015 to 1.5% for the reducing component, based on the amount of monomers.

The redox combination can be further activated by the presence of polyvalent metal ions at the lower oxidation state, e.g., ferrous sulfate, cuprous sulfate, and the like. The preferred amount of these metal salts is between 5 ppm and 100 ppm by weight, based on the total amount of the monomers.

The aqueous medium for polymerization must contain one or more emulsifiers to help disperse the monomers in the aqueous medium, and to protect the particles formed. Though a number of surfactants may be used to ensure the stability of the latices of poly(methacrylic acid-co-methylacrylate), the use of dioctyl sulfosuccinate is especially advantageous. This surfactant produces latices which thicken acrylic polymer systems better than latices made with other surfactants. Furthermore, the dioctyl ester is the only ester of sulfosuccinic acid that gives these excellent results. Other esters of sulfosuccinic acid, surprisingly, fail to protect the particles of our latices, which therefore coagulate in their presence.

The amount of surfactant employed can be varied considerably, but ordinarily from about 0.5% to about 10% and more particularly from about 0.8% to about 5.0%, by weight, based on the total weight of the comonomers, will be used. Some additives such as alcohols and the like can also be used in order to improve the solubility of insoluble monomers. The concentration of these materials can be varied between 0.1% and 2.0% by weight, based on the weight of the comonomers.

The emulsion can also contain a small amount of a protective colloid, such as water soluble cellulose derivatives, poly(vinylpyrrolidone), alkali metal polyacrylates, water soluble alginates, and the like. The amount of such a colloid used can range, for example, from about 0.5% to about 5% and more particularly from about 1.0% 3%.

The emulsions of the invention typically have from about 15% and preferably from about 20% to about 50% solids content. The average particle size of the latex may be from 500 Ångstroms or smaller to about 3000 Ångstroms or greater.

The reaction temperature applied depends, in the first place, on the polymerization catalyst and the monomers used. In general, the polymerization is carried out at an initial temperature in the range of from 5° C. to 80° C., advantageously 15° C. to 60° C.

It is advisable to operate with the exclusion of oxygen, for example, under a neutral gas such as nitrogen, argon and the like. Sometimes it can also be advantageous to run the reaction under elevated or reduced pressure.

The polymerization can be run conveniently by a single stage procedure, when all the ingredients are charged to the reactor at the same time. Since the polymerization reaction is exothermic, the initiation thereof can be evidenced by the increasing temperature. When the polymerization has proceeded to the extent that the consumption of the monomers is practically complete, the terminal point is indicated by the cessation in the rise of the temperature, followed by temperature drop. The time period necessary for this aforedescribed operation can range from about 10 minutes to about 2 hours.

The copolymers of this invention are excellent thickening agents and can influence the viscosity of acrylic polymer systems in an effective and unique way. Not only can the copolymers of the present invention form viscous systems with these water based dispersions of materials insoluble in the medium, but they can thicken also dilute solutions of materials soluble in water, as well as thicken materials which are themselves miscible in water. Furthermore, they can thicken water itself, at pH 7.0 and higher, a unique property which may be attributed to the high molecular weight of these polymers. Another property that may contribute to this phenomenon is the uniquely high acid content of the copolymers. The viscosity of a solution at pH 7.0 which contains as little as 0.5% of these copolymers can be as high as 3500 cps or more as compared to the viscosities of a few hundred centipoises that are obtained by thickeners made under different circumstances. The unique thickening properties of these copolymers makes them suitable for a variety of applications.

Only a relatively small amount of the copolymer latices of the present invention are required to produce significant thickening of the acrylic latices with which such copolymers are blended. Such blends can contain from about 0.1 to about 5% of the copolymer on a total solids basis and particularly, from about 0.5 to about 2% of the copolymers on a total solids basis.

It is generally known, e.g., that the viscosity of carboxylic acid polymers can be increased by
(a) solubilization of the polymer through salt formation, or
(b) swelling of the polymer by hydration of the ion pair.

From these, the conclusion could be drawn that the viscosity of the system must be a function of the concentration of the carboxyl units alone. However, in the case of the present copolymers, surprisingly, it has been found that it is the presence of the methacrylate units which has made the copolymers of this invention so exceptionally active with acrylic copolymer latices; for systems containing a higher ester of acrylic acid (e.g., the ethyl derivative) showed significantly decreased activity. The highly increased viscosity is an inherent property of the copolymers of the methyl ester of acrylic acid, and cannot be achieved by adding other monomers to the ethyl derivative. While it is not intended that this invention be limited or bound in any way with theoretical considerations, it is nevertheless believed that it is the higher water solubility of the methyl ester as well as its better compatibility with the substrate, which is responsible for the unique behavior of the copolymers of the present invention.

The present copolymers, previously described above, are particularly useful for changing the rheological behavior of systems containing acrylic polymers. However, they can also be used for thickening dispersions of water-insoluble and water-soluble polymers of all types. Examples of such water insoluble dispersions can include natural rubber latex, emulsion polymers of acrylic and vinyl types as well as their copolymers. Poly(vinyl-pyrrolidone), poly(acrylamide), poly(vinyl methyl ether), etc., can serve as examples of the thickenable water-soluble species.

An important feature of this invention involves the fact that its subject polymers can be prepared as low viscosity emulsions. Therefore, they act as "in situ" thickening agents. By the term "in situ" — as this term is used herein — is meant that a system of high viscosity can be prepared by adding a low viscosity acid latex to a low viscosity alkaline solution or dispersion, and blending the two ingredients into a uniform system. Of course, the latter ingredients can also be neutral or even slightly acidic, in which case, the high viscosity can be achieved by simple adjusting of the pH of the blend above the neutral point, which is a distinct advantage over the use of other known thickening agents. These known thickening agents, such as salts of acrylic acid, cellulose derivatives, natural gum, etc., are stored and used as high viscosity solutions. Because of this high viscosity, they are difficult to handle and usually demand special equipment to achieve thorough blending with the substrate. By way of contrast to those thickeners, the latices of this invention are of very low viscosity (usually less than 50 cps). Therefore, they can be stored and handled with ease.

The acrylic polymers to be thickened by the copolymer latices of this invention are conveniently used for the coating, impregnating, cementing, and laminating of textiles. Furthermore, they can be used for dressing, sizing, and finishing of paper, leather, felts, and the like. They are applicable also in paints, printing inks, protective coatings, etc. Moreover, the polymers of this invention can be used also in the thickening of cosmetic preparations, such as creams, lotions and hair grooming aids. They can be applied as thickening agents also of detergents, polishes, cleaning compositions, and other household products.

The aqueous solutions and dispersions to be thickened can contain all sorts of other substances, suitable to enhance the properties of the thickened system, such as fillers, pigments, stabilizers, curing agents, binders, foaming agents, dyes, and other such additives.

The following examples are provided to illustrate the principles and practice of the invention. However, it will be understood that these examples are not to be construed as limiting the scope of the present invention in any manner.

In these examples, all percentages and parts are by weight, unless otherwise indicated.

EXAMPLE I

Method of Testing

A 400 ml. beaker is tared on an electric top-loading balance and 200 grams of acrylic latex (Hycar 2679, available from the B. F. Goodrich Chemical Co.) is weighted in it with 0.05 gram accuracy. (The solid content of the latex is 50%). To that, 5.6 g. of a 20% thickener latex is added dropwise (or a commensurate amount depending upon the predetermined solid content of the thickener latex). The 400 ml. beaker holding the mixture of latices is placed under an electric stirring apparatus that is equipped with a Teflon stirrer. Agitation is started, and the pH of the sample is brought up to 7.0 by adding concentrated ammonia dropwise. The speed of agitation is increased gradually, as the viscosity of the system increases. After that, the sample is placed in a 250 ml. centrifuge tube and centrifuged for 30 minutes at 30,000 RPM to remove the air bubbles from the system. One hundred grams of this viscous solution is transferred into a 4 oz. jar and the viscosity is determined with an LVF Brookfield viscosimeter using Spindle #4.

EXAMPLE II

Preparation of methacrylic acid — methylacrylate copolymer (60/40).

Apparatus: 5 liter resin kettle equipped with mechanical stirrer, reflux condenser, thermometer and gas inlet tube.

Procedure: Under a blanket of nitrogen, the ingredients of the reaction were charged with agitation, in the following order:
2828.4 g. distilled water,
9.6 g. sodium dioctyl sulfosuccinate (75%) (Aerosol OT, Product of American Cyanamid Co.),
10.6 g. n-butanol,
429.0 g. methacrylic acid,
286.0 g. methylacrylate
0.093 g. poly(ethyleneglycol-200-)dimethacrylate,
2.85 g. of a 10% ammonium persulfate solution and
4.77 g. of a 0.1% ferrous sulfate solution.

At this point 3.57 g. of a 10% solution of concentrated sodium hydrosulfite (Lykopon, available from Rohm and Haas Co.) was introduced. The temperature of the system was raised to 40° C., whereupon heating was discontinued. The temperature reached its peak 41 minutes later at 65° C. After that, the latex was allowed to cool to room temperature, and then it was discharged through a 100 mesh stainless steel screen.

EXAMPLE III

Emulsion copolymer is prepared by the process described in Example II, except that the comonomer is ethyl acrylate instead of methyl acrylate.

Ratio of methacrylic acid-ethyl acrylate is 60/40.

EXAMPLE IV

Emulsion copolymer is prepared as described in Example II, except that a 10% solution of sodium dodecyl benzene sulfonate (Siponate DS-10, available from Alcolac Co.) is employed in lieu of Aerosol OT.

Ratio of methyacrylic acid-methyl acrylate is 60/40.

EXAMPLE V

Emulsion copolymer is prepared as described in Example II except that a 10% solution of sodium dodecyl sulfate (Duponol WAQ, available from E. I. duPont de Nemours) is employed in lieu of Aerosol OT.

Ratio of methacrylic acid-methyl acrylate is 60/40.

SUMMARY OF RESULTS

The results of employing the copolymers of Examples II-V as thickeners for acrylic latices as described in Example I are summarized in the following Table, which shows Brookfield viscosities in cps:

|  | Example Monomer Surfactant | II Methylacrylate Aerosol OT-75* | IV Methylacrylate Siponate DS-10** | V Methylacrylate Duponol WAQ*** | III Ethylacrylate Aerosol OT-75* |
|---|---|---|---|---|---|
| Brookfield Viscosity | 6 | >100,000 | 52,800 | 47,000 | 35,500 |
| cps | 12 | > 50,000 | 30,800 | 27,500 | 20,250 |
| LVF, Spindle #4 | 30 | > 20,000 | 15,480 | 13,700 | 10,200 |
| RPM | 60 | > 10,000 | 9,400 | 8,250 | 6,200 |
|  |  | Invention |  |  | Comparative Experiment |

*Dioctyl Sodium Sulfosuccinate - available from American Cyanamid Co.
**Dodecyl Benzene Sodium Sulfonate - available from Alcolac Co.
***Sodium Dodecyl Sulfate - available from E.I. duPont de Nemours

What is claimed is:

1. A method for thickening acrylic polymer latices which comprises blending therewith a copolymer latex prepared by inducing, at a temperature of about 5° C. to about 80° C, a redox-initiated polymerization in an aqueous dispersion of, as monomers, (1) from about 30 to about 75 wt. % of an α,β-unsaturated carboxylic acid of the formula

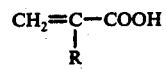

in which R is methyl or ethyl, and (2) from about 25 to about 70 wt. % of methylacrylate.

2. A method according to claim 1 in which (1) is methacrylic acid.

3. A method according to claim 1 in which the range of monomer (1) is from 50 to 65 wt. % and the range of monomer (2) is from 35 to 50 wt. %.

4. A method according to claim 3 in which monomer (1) is methacrylic acid.

5. A method according to claim 1 wherein the copolymer latex is blended with the acrylic latex in an amount of from about 0.1 to about 5% on a total solids basis.

6. A method as defined in claim 5 wherein the copolymer latex is blended in an amount ranging from about 0.5 to about 2% on a total solids basis.

* * * * *